United States Patent
Kawagoe

(10) Patent No.: US 11,757,121 B2
(45) Date of Patent: Sep. 12, 2023

(54) FUEL CELL SYSTEM AND METHOD FOR CONTROLLING FUEL CELL SYSTEM

(71) Applicant: NISSAN MOTOR CO., LTD., Yokohama (JP)

(72) Inventor: Yuto Kawagoe, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/637,177

(22) PCT Filed: Aug. 30, 2019

(86) PCT No.: PCT/IB2019/000835
§ 371 (c)(1),
(2) Date: Feb. 22, 2022

(87) PCT Pub. No.: WO2021/038257
PCT Pub. Date: Mar. 4, 2021

(65) Prior Publication Data
US 2022/0285713 A1    Sep. 8, 2022

(51) Int. Cl.
*H01M 8/0612*    (2016.01)
*H01M 8/04228*    (2016.01)
(Continued)

(52) U.S. Cl.
CPC ..... *H01M 8/0618* (2013.01); *H01M 8/04022* (2013.01); *H01M 8/0491* (2013.01);
(Continued)

(58) Field of Classification Search
CPC ........... H01M 8/0618; H01M 8/04228; H01M 8/04022; H01M 8/04119; H01M 8/04753;
(Continued)

(56) References Cited

U.S. PATENT DOCUMENTS

2008/0160361 A1* 7/2008 Ohara ............... H01M 8/04303
429/444
2015/0044587 A1* 2/2015 Matsuo ............... H01M 8/2457
429/423
(Continued)

FOREIGN PATENT DOCUMENTS

JP    2005-340075 A    12/2005
JP    2016-122507 A    7/2016
(Continued)

OTHER PUBLICATIONS

Machine Translation of WO-2017104257-A1 (Mar. 10, 2023) (Year: 2023).*
(Continued)

*Primary Examiner* — Matthew J Merkling
(74) *Attorney, Agent, or Firm* — Foley & Lardner LLP

(57) ABSTRACT

A fuel cell system includes a solid oxide fuel cell capable of generating power by receiving a supply of a reformed gas and an oxidant gas; an oxidant gas supply device that supplies the oxidant gas to the fuel cell; a reforming unit that supplies the reformed gas to the fuel cell; a fuel supply device that supplies a fuel which is a raw material for the reformed gas to the reforming unit; a combustion unit that combusts discharged gases of the fuel cell, wherein the reforming unit can reform the fuel into the reformed gas by exchanging heat with a combustion gas produced by the combustion unit; and a first control unit controls the fuel supply device to additionally supply the fuel to the fuel cell through the reforming unit in order to prevent the oxidant gas from flowing in from downstream of a fuel electrode of the fuel cell at the time of stopping the system. The fuel cell system further includes a second control unit that controls to supply the fuel to the reforming unit before the additional supply so that the temperature of the reformed gas flowing (Continued)

into the fuel cell does not exceed a predetermined temperature at the time of stopping the system.

12 Claims, 7 Drawing Sheets

(51) Int. Cl.
*H01M 8/04014* (2016.01)
*H01M 8/04119* (2016.01)
*H01M 8/04746* (2016.01)
*H01M 8/04858* (2016.01)
*H01M 8/1213* (2016.01)
*H01M 8/12* (2016.01)

(52) U.S. Cl.
CPC ... *H01M 8/04119* (2013.01); *H01M 8/04228* (2016.02); *H01M 8/04753* (2013.01); *H01M 8/1213* (2013.01); *H01M 2008/1293* (2013.01)

(58) Field of Classification Search
CPC ............ H01M 8/0491; H01M 8/1213; H01M 2008/1293
See application file for complete search history.

(56) References Cited

U.S. PATENT DOCUMENTS

| | | | |
|---|---|---|---|
| 2015/0064586 A1* | 3/2015 | Matsuo | H01M 8/04753 429/423 |
| 2015/0086887 A1 | 3/2015 | Matsuo et al. | |
| 2018/0375127 A1* | 12/2018 | Yamazaki | H01M 8/04303 |
| 2019/0006683 A1 | 1/2019 | Shiomi | |
| 2019/0372136 A1* | 12/2019 | Sato | H01M 8/04302 |

FOREIGN PATENT DOCUMENTS

| | | | |
|---|---|---|---|
| WO | WO-2010117033 A1 * | 10/2010 | C01B 3/382 |
| WO | WO-2017104257 A1 * | 6/2017 | |

OTHER PUBLICATIONS

Machine Translation of WO-2010117033-A1 (Mar. 10, 2023) (Year: 2023).*

* cited by examiner

FUEL CELL SYSTEM AND METHOD FOR CONTROLLING FUEL CELL SYSTEM

TECHNICAL FIELD

The present invention relates to a fuel cell system and a method for controlling a fuel cell system.

BACKGROUND ART

JP2016-122507A discloses a technique of a fuel cell module comprising a fuel cell, which is supplied with a reformed gas and an oxidant gas to generate power, a combustor, which combusts a gas discharged from the fuel cell to produce a combustion gas, and a reformer, which can reform a fuel which is a raw material of the reformed gas by exchanging heat with the combustion gas, wherein additional fuel is intermittently supplied to the fuel cell when the temperature of the fuel cell module reaches the temperature at which the oxidant gas begins to flow back to a fuel electrode side of the fuel cell module after the extraction of electric power from the fuel cell module is stopped.

SUMMARY OF INVENTION

However, when the system stops the fuel supply immediately after receiving a power generation stop command, the reformed gas remains in the reformer and the heat exchange with the reformed gas proceeds, and the reformed gas reaches a high temperature that exceeds an upper heat-resistance temperature limit of a fuel cell stack. In addition, if the system is miniaturized, the passage connecting the fuel cell stack and the combustor becomes shorter, and thus, the time until the oxidant gas flows back to the fuel electrode side becomes shorter. Therefore, when additional fuel is supplied as described above, the time from when the system receives the power generation stop command to when the additional supply is performed is shortened, and thus, a high-temperature reformed gas might be supplied to the fuel cell stack without a temperature dropping.

Here, the present invention aims to provide: a fuel cell system that prevents a reformed gas which exceeds an upper heat-resistance temperature limit of a fuel cell stack from being supplied to the fuel cell stack when supplying additional fuel after a system stop command is given, and a method for controlling the fuel cell system.

A fuel cell system according to one embodiment of the present invention is a fuel cell system, including a solid oxide fuel cell capable of generating power by receiving a supply of a reformed gas and an oxidant gas, an oxidant gas supply device that supplies the oxidant gas to the fuel cell, a reforming unit that supplies the reformed gas to the fuel cell, a fuel supply device that supplies a fuel which is a raw material for the reformed gas to the reforming unit, a combustion unit that combusts discharged gases of the fuel cell, wherein the reforming unit can reform the fuel into the reformed gas by exchanging heat with a combustion gas produced by the combustion unit, and a first control unit controls the fuel supply device to additionally supply the fuel to the fuel cell through the reforming unit in order to prevent the oxidant gas from flowing in from downstream of a fuel electrode of the fuel cell at the time of stopping the system, and the fuel cell system comprising a second control unit that controls to supply the fuel to the reforming unit before the additional supply so that the temperature of the reformed gas flowing into the fuel cell does not exceed a predetermined temperature at the time of stopping the system.

DESCRIPTION OF EMBODIMENTS

Hereinafter, embodiments of the present invention will be described with reference to the drawings.

[Configuration of Fuel Cell System]

Figure 1:
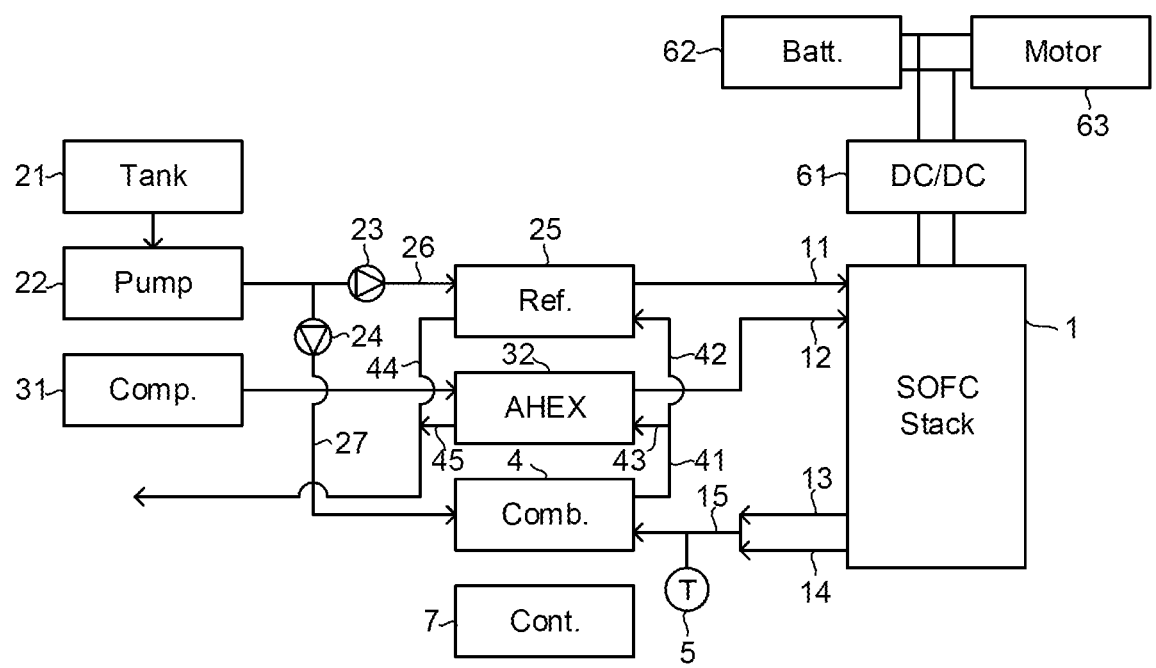
FIG. 1 is a block diagram illustrating main components of a fuel cell system according to this embodiment.

FIG. 1 is a block diagram illustrating main components of a fuel cell system according to this embodiment. The fuel cell system according to this embodiment includes a fuel supply system that supplies an anode gas (reformed gas) to a fuel cell stack 1 (fuel cell), an air supply system that supplies air (cathode gas, oxidant gas) to the fuel cell stack 1, a combustion system that combusts an anode off-gas (anode gas) and a cathode off-gas (cathode gas) discharged from the fuel cell stack 1, and a drive system that obtains power by extracting electric power from the fuel cell stack 1. The fuel cell system is mainly installed in vehicles (electric vehicles).

The fuel supply system includes a tank 21, a pump 22 (fuel supply device), injectors 23, 24 (fuel supply device), and a reformer 25 (reforming unit). The air supply system includes a compressor 31 and a heat exchanger 32. The combustion system includes a combustor 4 (combustion unit). The drive system includes a DC/DC converter 61, a battery 62, and a drive motor 63. Further, the fuel cell system includes a control unit 7 (a first control unit, a second control unit, a third control unit) that controls operations of the entire system.

The fuel cell stack 1 is a solid oxide fuel cell (SOFC) in which cells are stacked and the cell is obtained by sandwiching an electrolyte layer made of a solid oxide such as ceramic between an anode (fuel electrode), to which the anode gas (reformed gas) reformed by the reformer 25 is supplied, and a cathode (air electrode), to which air containing oxygen is supplied as the cathode gas (oxidant gas). In the fuel cell stack 1, power is generated by reacting hydrogen contained in the anode gas with oxygen contained in the cathode gas, and the anode off-gas (containing the anode gas) and the cathode off-gas (containing oxygen) generated from the reaction are discharged.

The fuel cell stack 1 is connected to a passage 11 configured to supply the anode gas to the fuel cell stack 1, a passage 12 configured to supply the cathode gas to the fuel cell stack 1, a passage 13 configured to discharge the anode off-gas (anode gas) discharged from the fuel cell stack 1 to the side of the combustor 4, and a passage 14 configured to discharge the cathode off-gas (cathode gas) discharged from the fuel cell stack 1 to the side of the combustor 4. Here, the passage 13 and the passage 14 are merged by a merging passage 15, and the merging passage 15 is connected to the combustor 4.

Here, the anode includes an inner passage (connected to the passage 11) of the fuel cell stack 1 configured to supply the anode gas to the anode electrode, and an inner passage (connected to the passage 13) of the fuel cell stack 1 configured to discharge the anode off-gas reacted in the anode electrode, as well as the anode electrode constituting the fuel cell stack 1. Similarly, the cathode includes an inner passage (connected to the passage 12) of the fuel cell stack 1 configured to supply the cathode gas to the cathode electrode, and an inner passage (connected to the passage 14) of the fuel cell stack 1 configured to discharge the cathode off-gas reacted in the cathode electrode, as well as the cathode electrode constituting the fuel cell stack 1.

The fuel supply system includes a main passage 26 that connects the tank 21, the pump 22, the injector 23, and the reformer 25 in series in this order, and a sub passage 27 that branches off from the position between the pump 22 and the injector 23 of the main passage 26 and connects to the combustor 4, and the injector 24 is interposed in the sub passage 27.

The tank 21 stores a reformation fuel, for example, consisting of a liquid obtained by mixing ethanol and water, and the pump 22 sucks the fuel to supply the fuel to the injectors 23, 24 at a constant pressure.

The injectors 23 and 24 include a nozzle body (not shown in the figure) where the fuel is pumped by the pump 22, a plunger rod (not shown in the figure) biased in a direction of closing a fuel injection hole (not shown in the figure) at the tip of the nozzle body, and a solenoid (not shown in the figure) that moves the plunger rod in a direction opposite to the direction of the bias. In the injectors 23 and 24, by applying a control current to the solenoid, the solenoid drives the plunger rod to move in the opposite direction, causing the plunger rod to open the fuel injection hole and inject fuel. Further, by stopping the control current, the drive of the solenoid is stopped, and the plunger rod moves by the biasing force to close the fuel injection hole and stop the fuel injection. In the injectors 23 and 24, the duty ratio of opening/closing the fuel injection hole depends on the duty ratio of on/off of the control current. Thus, the injectors 23 and 24 can adjust the flow rate of the fuel to be injected by adjusting the duty ratio of the control current.

The reformer 25 reforms the fuel supplied from the injector 23 into an anode gas containing hydrogen and supplies it to the fuel cell stack 1. By exchanging heat with the combustion gas discharged from the combustor 4, the reformer 25 can vaporize the fuel supplied from the injector 23, reform the vaporized fuel into an anode gas by catalytic reaction and meanwhile heat the anode gas to a temperature where an electrochemical reaction (power generation reaction) is possible in the fuel cell stack 1. The reformer 25 can supply the anode gas to the fuel cell stack 1.

The compressor 31 (oxidant gas supply device) takes in outside air and supplies air (cathode gas) to the heat exchanger 32. The heat exchanger 32 can heat the air to a temperature where an electrochemical reaction is possible in the fuel cell stack 1 by exchanging heat with the combustion gas discharged from the combustor 4 and supply the air to the fuel cell stack 1 as the cathode gas. Further, as the oxidant gas supply device, a device capable of directly supplying high-temperature air (cathode gas) to the fuel cell stack 1 without exchanging heat with the combustion gas may be applied.

The combustor 4 produces a combustion gas containing carbon dioxide or water as a main component by catalytically combusting a mixed gas (discharged gas) of the anode off-gas (discharged gas) and the cathode off-gas (discharged gas). The combustor 4 is mounted with a heater (not shown in the figure) that raises the temperature of the fuel to a combustible temperature in a catalyst (not shown in the figure). Further, the combustor 4 is connected to the sub passage 27, and by combusting the fuel supplied from the injector 24 in the catalyst, the temperature of the catalyst can be raised to a catalytic combustible temperature.

The combustion gas generated by the combustor 4 is discharged from a passage 41. The passage 41 branches into a passage 42 and a passage 43, the passage 42 is connected to the reformer 25, and the passage 43 is connected to the heat exchanger 32. A passage 44 is connected to the reformer 25, and the combustion gas used for exchanging heat with the reformer 25 is discharged from the passage 44. A passage 45 is connected to the heat exchanger 32, and the combustion gas used for exchanging heat with the heat exchanger 32 is discharged from the passage 45. Thus, the combustion gas discharged to the passage 44 and the passage 45 is exhausted to the outside.

A temperature sensor 5 is mounted in, for example, the merging passage 15, and outputs the temperature information of the mixed gas flowing through the merging passage 15 to the control unit 7. The control unit 7 can estimate the outlet temperature of the fuel cell stack 1 from the temperature of the mixed gas.

The DC/DC converter 61 is connected to the fuel cell stack 1 and boosts an output voltage of the fuel cell stack 1 to supply electric power to the battery 62 or the drive motor 63. The battery 62 can be charged with the electric power supplied from the DC/DC converter 61 and can supply the electric power to the drive motor 63. The drive motor 63 is connected to the battery 62 and the DC/DC converter 61 via an inverter (not shown in the figure) to serve as a power source of a vehicle. Further, the drive motor 63 generates regenerative electric power during a vehicle deceleration, and this regenerative electric power can be charged in the battery 62.

The control unit 7 comprises a widely used electronic circuit including a microcomputer, a microprocessor, and a CPU, as well as peripheral equipment, wherein by executing a specific program, the process to control the fuel cell system is carried out. In addition, the control unit 7 can perform a drive/stop control (ON/OFF control) for the components constituting the fuel cell system.

A control of the fuel cell system performed by the control unit 7 includes a warm-up control for warming up the fuel cell stack 1, a power generation control for performing normal power generation, and a stop control for stopping the system. The control unit 7 can output a control current to the injectors 23 and 24 (solenoid) to control the duty ratio thereof. In addition, the control unit 7 can control the extraction current (power generation amount) from the fuel cell stack 1 by outputting a PWM signal to the DC/DC converter 61 to change the duty ratio thereof. Further, information on SOC (State Of Charge: battery charge rate) is input from the battery 62 to the control unit 7, and the necessity of power generation by the fuel cell stack 1 can be determined based on the value of SOC.

Further, although not shown in the drawing, the fuel cell system may be configured to connect a circuit, which applies a voltage that is opposite in polarity to the fuel cell stack 1 (for example, a voltage that has the same absolute value as the open circuit voltage of the fuel cell stack 1) from the outside to the fuel cell stack 1, so that the control unit 7 can switch control the circuit to suppress deterioration (oxidation) of the anode (anode electrode) during the stop control.

[Warm-Up Control of Fuel Cell System]

The warm-up control of the fuel cell system starts on the occasion of an ignition-on operation of a user (operation of turning on a vehicle start key), or on the occasion that the SOC of the battery 62 falls below a predetermined value. First, when the system starts a warm-up control, the control unit 7 turns on the heater of the combustor 4 to heat the catalyst of the combustor 4 until the fuel is at a combustible temperature.

Next, the control unit 7 turns on the compressor 31 and the pump 22, and outputs the control current of a predetermined duty ratio to the injector 24 to supply fuel to the combustor 4. Consequently, air is supplied to the combustor 4 via the heat exchanger 32 and the fuel cell stack 1, the fuel supplied to the combustor 4 is combusted, and the temperature of the catalyst is further raised. At this time, the control unit 7 turns off the heater.

In the combustor 4, a combustion gas is generated by combusting the fuel, and the combustion gas is supplied to the reformer 25 and the heat exchanger 32, and the reformer 25 and the heat exchanger 32 are heated. By heating the heat exchanger 32, the air passing through the heat exchanger 32 is heated, and the heated air is supplied to the fuel cell stack 1 to heat the fuel cell stack 1.

The control unit 7 stops the control current to the injector 24 and outputs a control current to the injector 23 at a predetermined duty ratio at a stage where the temperature of the reformer 25 reaches the temperature which is required for the electrochemical reaction and is capable of reforming the fuel, the temperature of the fuel cell stack 1 and the heat exchanger 32 reaches the temperature required for the electrochemical reaction, and the combustor 4 reaches a catalytic combustible temperature. Consequently, the supply of fuel to the combustor 4 is stopped, and the reformer 25 is supplied with fuel at a predetermined flow rate. By reforming the fuel supplied to the reformer 25 into the anode gas (reformed gas) and supplying the gas to the fuel cell stack 1, and by supplying the air heated by the heat exchanger 32 to the fuel cell stack 1 as the cathode gas, the electrochemical reaction is started in the fuel cell stack 1 and the warm-up control ends. Further, the anode gas (anode off-gas) and the cathode gas (cathode off-gas) discharged from the fuel cell stack 1 are combusted in a catalytic reaction in the combustor 4, and the combustion gas produced by the combustion continues to exchange heat with the reformer 25 and the heat exchanger 32.

[Power Generation Control of Fuel Cell System]

Next, operations performed in the power generation control of the fuel cell system will be described. In the power generation control of the system, the fuel supplied from the tank 21 is reformed to the anode gas in the reformer 25, and this anode gas is supplied to the fuel cell stack 1 (anode). On the other hand, the temperature of the air as the cathode gas is raised by the heat exchanger 32, and then, the air is supplied to the fuel cell stack 1 (cathode). In the fuel cell stack 1 to which the anode gas and the cathode gas are supplied, electric power is generated in an electrochemical reaction. The anode off-gas and the cathode off-gas that are used in the electrochemical reaction are introduced into the combustor 4. In addition, the combustor 4 combusts a mixture of the anode off-gas and the cathode off-gas to produce a combustion gas, and the combustion gas passes through the heat exchanger 32 and the reformer 25 to heat them.

In addition, in order to supply a predetermined electric power to the battery 62 or the drive motor 63, the control unit 7 controls the extraction current from the fuel cell stack 1 by outputting a PWM (Pulse Width Modulation) signal to the DC/DC converter 61 to change the duty ratio of the PWM signal.

During driving of a vehicle, the anode gas supply amount (injection amount of the injector 23) and the cathode gas supply amount (rotation speed of the compressor 31) can be changed nearly linearly in proportion to the electric power required for the system (the battery 62, the drive motor 63, etc.). However, the fuel cell stack 1 necessitates electric power for maintaining the fuel cell stack 1 in a generable state, that is, electric power for operating auxiliary machinery such as the pump 22 and the compressor 31. Therefore, even when electric power required for the fuel cell stack 1 is zero, the fuel cell stack 1 generates at least electric power for operating the aforementioned auxiliary machinery.

During the power generation of the fuel cell stack 1, the fuel cell stack 1 maintains a predetermined temperature (for example, 600° C.) by heating (and electrochemical reaction) with the anode gas and the cathode gas. Since the anode gas and the cathode gas are supplied to the combustor 4 and combusted to produce the combustion gas, the combustor 4 and the combustion gas maintain a predetermined temperature ($T_{comb}$, for example, 800° C., see FIG. 2). The reformer 25 supplies the anode gas at a predetermined temperature (outlet temperature of the reformer 25: $T_{fuel\_out}$, for example, 600° C., see FIG. 2) by exchanging heat with the combustion gas. The heat exchanger 32 also supplies the cathode gas at a predetermined temperature (for example, 600° C.) to the fuel cell stack 1 by exchanging heat with the combustion gas. Further, the temperature of the reformed gas flowing into the fuel cell stack 1 can be expressed by, for example, the temperature of the reformer 25 (outlet temperature of the reformer 25: $T_{fuel\_out}$), and the temperature of the cathode gas flowing into the fuel cell stack 1 can also be expressed by the temperature of the heat exchanger 32.

[Stop Control of Fuel Cell System]

Figure 2:
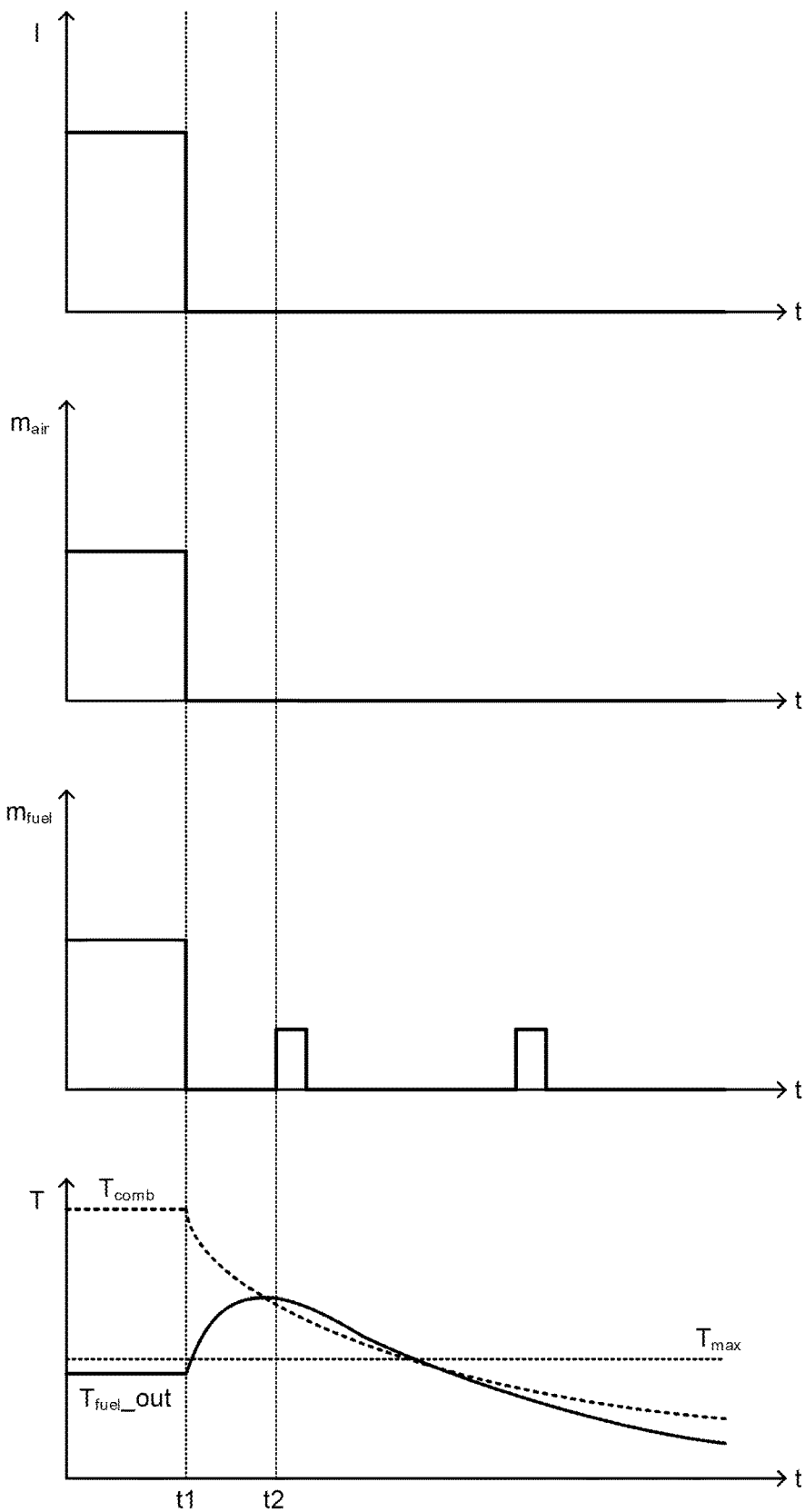
FIG. 2 is a time chart illustrating changes in an outlet temperature of a reformer (anode gas temperature) in a case where an extraction current, an anode gas flow rate, and a cathode gas flow rate are respectively set to zero at the time of a system stop command.

FIG. 2 is a time chart illustrating changes in the outlet temperature of the reformer 25 (anode gas temperature) in a case where the extraction current, the anode gas flow rate, and the cathode gas flow rate are respectively set to zero at the time of a system stop command.

The stop control of the fuel cell system is performed by the control unit 7. The stop control starts as an ignition-off operation (operation of turning off a vehicle start key), which is performed by a user after the vehicle stops, terminates or the SOC of the battery 62 has reached a predetermined charge rate and the power generation request for the fuel cell stack 1 terminates, or as the user has performed an operation to stop the fuel cell stack 1 (especially the compressor 31) in order to reduce the noise generated from the vehicle.

As shown in FIG. 2, when a system stop command is received at time t1, the normal stop control stops power generation (sets the extraction current I to zero), and stops the supply of the anode gas (supply amount: $m_{fuel}$) and the cathode gas (supply amount: $m_{air}$).

At this time, the reformer 25 and the fuel cell stack 1 (anode) are disconnected from the side of the tank 21. Thus, as the time elapses, the pressure of the anode decreases and becomes lower than the pressure of the cathode when the temperature of the fuel cell stack 1 decreases, and therefore, the cathode gas flows back to the anode via the merging passage 15.

Therefore, after the system stop command at time t1, the anode gas (or unreformed fuel gas) is supplied to the fuel cell stack 1 (anode) via the reformer 25 by supplying additional fuel to the reformer 25 at time t2, and the cathode gas gets into the anode electrode and the anode electrode comes in contact with oxygen to prevent the electrode from being deteriorated. After that, additional fuel is intermittently supplied according to the temperature decrease (pressure decrease of the anode), and when the temperature of the fuel cell stack 1 becomes lower than the lower limit temperature (for example, 300° C.) at which the anode electrode undergoes a deterioration reaction, the fuel supply is completely stopped to end the process.

When the stop control is started, the flow rate of the anode gas and the cathode gas supplied to the combustor 4 decreases sharply and the generation amount of the combustion gas decreases, causing the temperature ($T_{comb}$) of the combustor 4 and the combustion gas to decrease, but for a while, the temperature has been maintained in a state of being higher than the upper heat-resistance temperature limit $T_{max}$ (for example, 620° C.) of the fuel cell stack 1.

On the other hand, in the reformer 25, when the supply of the anode gas (fuel supply by the injector 23) stops, the anode gas stays in the reformer 25, and the heat exchange between the staying anode gas and the combustion gas progresses, and further, as the amount of the reforming reaction, which is an endothermic reaction, decreases, the temperature of the anode gas may exceed the upper heat-resistance temperature limit $T_{max}$ of the fuel cell stack 1.

Further, when the entire fuel cell system is miniaturized, the passage 13 and the passage 14 are shortened, and therefore, the cathode gas flows back to the anode side via the merging passage 15 and reaches the anode electrode faster. Therefore, when the aforementioned time t2 approaches time t1 and the temperature of the anode gas near the outlet of the reformer 25 (temperature $T_{fuel-out}$) is still higher than the upper heat-resistance temperature limit $T_{max}$ of the fuel cell stack 1, additional fuel is supplied, and the anode gas is pushed out by the additional fuel and supplied to the fuel cell stack 1. By supplying additional fuel in this way, the backflow of the cathode gas can be avoided, but since the fuel cell stack 1 is exposed to the anode gas with a temperature exceeding the upper heat-resistance temperature limit $T_{max}$, heat damage is given to the fuel cell stack 1.

Thus, in this embodiment, by gradually reducing the supply amount of fuel to stop the supply instead of stopping the fuel supply instantly upon the system stop command, the fuel cell stack 1 is prevented from being exposed to the anode gas having a temperature higher than the upper heat-resistance temperature limit thereof.

Figure 3:
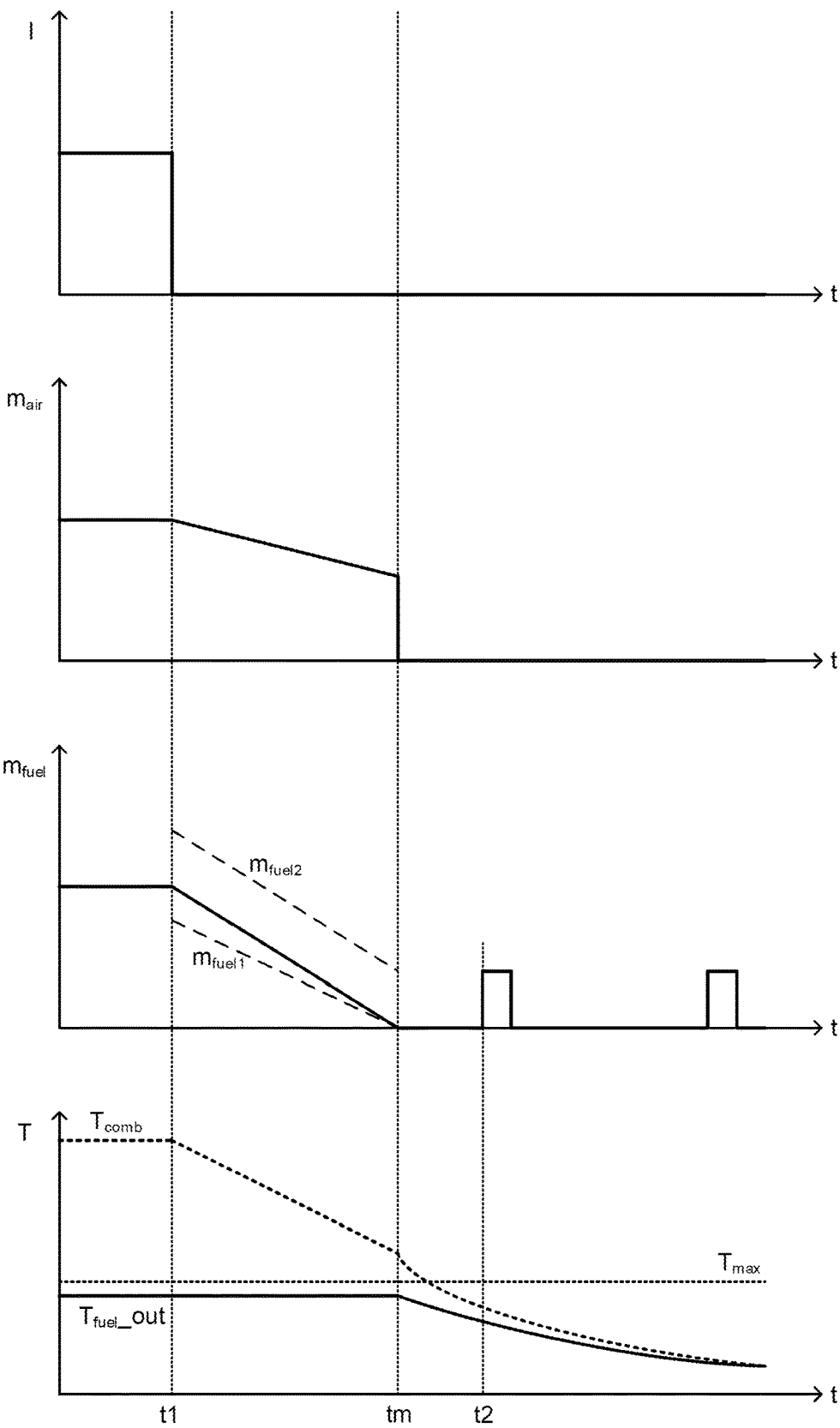
FIG. 3 is a time chart illustrating changes in an outlet temperature of a reformer (anode gas temperature) in a case where an anode gas flow rate and a cathode gas flow rate are gradually reduced to zero at the time of a system stop command.

FIG. 3 is a time chart illustrating changes in the outlet temperature of the reformer 25 (anode gas temperature) in a case where the anode gas flow rate and the cathode gas flow rate are gradually reduced to zero at the time of a system stop command.

[Temperature Change of Reformer (Anode Gas) During Stop Control]

As shown in FIG. 3, in this embodiment, when a system stop command is received at time t1, the fuel supply amount $m_{fuel}$ is gradually (for example, linearly) reduced to zero at time tm (t1<tm<t2). At this time, the supply amount $m_{air}$ of the air (cathode gas) is also reduced corresponding to the fuel supply amount $m_{fuel}$. The supply amount $m_{air}$ of the air (cathode gas) is reduced corresponding to the fuel supply amount $m_{fuel}$ in such a way that, for example, the mixing ratio of the anode gas and the cathode gas becomes the mixing ratio that maximizes the combustion efficiency in the combustor 4.

At this time, in the combustor 4, the supply amount of the anode gas and the cathode gas supplied from the fuel cell stack 1 gradually decreases and the amount of the combustion gas produced decreases, and therefore, the temperature of the combustor 4 (combustion gas) gradually decreases.

In the reformer 25, since fuel is supplied even after a system stop command is given, the anode gas does not stay in the reformer 25 and the amount of reforming reaction (endothermic reaction) is hardly reduced by the newly supplied fuel, and further, as described above, the temperature of the combustion gas also decreases, and therefore, the temperature rise of the anode gas supplied from the reformer 25 can be suppressed or avoided.

After that, when the supply of fuel (anode gas) and the supply of air (cathode gas) are stopped at time tm, the temperature of the reformer 25 (anode gas) and the temperature of the combustor 4 (combustion gas) dissipate heat (temperature decrease) based on the temperature difference from the outside.

As described above, since fuel is supplied even after a system stop command is given, the time for the cathode gas to flow back to the anode side can be extended accordingly. Therefore, even if additional fuel is supplied at time t2 (after time tm), the temperature of the anode gas (or unreformed fuel gas) pushed out to the side of the fuel cell stack 1 is lower than the temperature of the anode gas during power generation, and the pushed out anode gas does not cause heat damage to the fuel cell stack 1. Further, the supply amount of fuel supplied from time t1 to time tm is larger than the supply amount of the additional supply at time t2. Consequently, the temperature rise of the anode gas after the system stop command can be suppressed.

[Supply Amount (Lower Limit Value) of Fuel Supplied by Reformer during Stop Control]

Next, the supply amount $m_{fuel}$ of fuel to be supplied after a system stop command is given and the lower limit value $m_{fuel1}$ thereof will be examined. First, the heat exchange amount of fuel permitted in the reformer 25 is such that the fuel temperature does not exceed the upper heat-resistance temperature limit $T_{max}$ of the fuel cell stack 1 due to the heat exchange, and therefore, if the fuel temperature before the heat exchange (the inlet temperature of the reformer 25) is represented as $T_{ref}$ and the specific heat of the fuel is represented as $Cp_{fuel}$, the heat exchange amount (maximum value) is represented by $$m_{fuel1} \times Cp_{fuel} \times (T_{max} - T_{ref}) \qquad \text{[Equation 1]}$$

On the other hand, using the supply amount $m_{air}$ of the cathode gas and the exhaust branch ratio γ when considering mixing with the anode gas (combustion), the supply amount of the combustion gas is represented by $$m_{air} \times \gamma \quad \text{[Equation 2]}$$

The initial temperature of the combustion gas is the same as the temperature $T_{comb}$ of the combustor 4, but it is considered that this will eventually decrease to the fuel temperature before the heat exchange (the inlet temperature of the reformer 25) due to heat dissipation. Regarding the combustion gas, since fuel has already combusted, the specific heat of the combustion gas can be approximated to the specific heat $Cp_{air}$ of air. Therefore, the heat dissipation amount of the combustion gas in the reformer 25 is represented by $$(m_{air} \times \gamma) \times Cp_{air} \times (T_{comb} - T_{ref}) \quad \text{[Equation 3]}$$

Further, if the heat exchange efficiency of the reformer 25 is represented as $\eta_{ref}$, since the heat exchange amount of fuel is equal to the value (heat exchange amount) obtained by multiplying the heat dissipation amount of the combustion gas by $\eta_{ref}$, based on Equation 1 and Equation 3, the heat exchange amount of fuel is represented by $$m_{fuel1} \times Cp_{fuel} \times (T_{max} - T_{ref}) = \eta_{ref}(m_{air} \times \gamma) \times Cp_{air} \times (T_{comb} - T_{ref}) \quad \text{[Equation 4]}$$

Since power generation is stopped after the system is stopped, all the fuel supplied to the fuel cell stack 1 is combusted by the combustor 4. Therefore, if the amount of heat per unit mass of fuel (including the endothermic component of reforming reaction) is represented as LHV, the amount of heat generated by the combustor 4 is represented by $$m_{fuel1} \times LHV \quad \text{[Equation 5]}$$

Further, the air (cathode gas) discharged from the fuel cell stack 1 is used for the combustion of fuel in the combustor 4 and is heated to the temperature $T_{comb}$ of the combustor 4, and therefore, if the temperature of the cathode gas before combustion (the outlet temperature of the fuel cell stack 1) is represented as $T_{stk}$ (the temperature of mixed gas before combustion), the increase in the amount of heat of air between before and after combustion is represented by $$m_{air} \times Cp_{air} \times (T_{comb} - T_{stk}) \quad \text{[Equation 6]}$$

Thus, considering that all the amount of heat during the combustion of fuel is used for raising the temperature of air, $$m_{fuel1} \times LHV = m_{air} \times Cp_{air} \times T_{comb} - T_{stk}) \quad \text{[Equation 7]}$$

can be obtained from Equation 5 and Equation 6.

The temperature $T_{comb}$ of the combustion gas can be treated as a constant. Therefore, the supply amount $m_{fuel}$ of the fuel to be supplied after a system stop command is given and the lower limit value $m_{fuel1}$ thereof can be expressed as $$m_{fuel} \leq m_{fuel1} = f_1(T_{stk}, m_{air}) \quad \text{[Equation 8]}$$

so as to satisfy Equation 4 and Equation 7 simultaneously. Further, a temperature sensor (not shown in the figure) may be mounted in the passage 41 (FIG. 1) connected to the combustor 4, the temperature $T_{comb}$ of the combustion gas may be directly measured, the $T_{comb}$ may be incorporated as a parameter at $f_1$ (the same applies to $f_2$ described later), and the value of the $T_{comb}$ may be substituted into the $f_1$.

Here, $f_1$ is a function of the outlet temperature $T_{stk}$ of the fuel cell stack 1 and the supply amount $m_{air}$ of air (cathode gas), and can be formed in advance as a map having $T_{stk}$ and $m_{air}$ as parameters. Therefore, the control unit 7 can calculate the lower limit value $m_{fuel1}$ of the fuel supply amount after the system is stopped by estimating the outlet temperature $T_{stk}$ of the fuel cell stack 1 from the temperature information input from the temperature sensor 5 and estimating the supply amount ma of the cathode gas according to the rotation speed (output) of the compressor 31. The control unit 7 controls the fuel supply amount $m_{fuel}$ based on the lower limit value.

Since no power is generated after a system stop command is given, in Equation 8, $T_{stk}$ is a function whose value decreases as the time elapses, and $f_1$ is also a function which decreases monotonically as the time elapses, and finally becomes zero. Thus, $m_{fuel}$ decreases monotonically as the time elapses, and can be finally set to zero.

In the stop control, the rotation speed of the compressor 31 can also be set constant. In this case, since $f_1$ is a function that uses only the outlet temperature $T_{stk}$ of the fuel cell stack 1 as a variable, the lower limit value of the fuel supply amount $m_{fuel}$ can be easily calculated.

Further, when the temperature change in the outlet temperature $T_{stk}$ of the fuel cell stack 1 after a system stop command is given is reproducible, that is, when the temperature change can be approximated by a function of time as $T_{stk}(t)$, since $f_1$ is a function that uses only the supply amount $m_{air}$ of the cathode gas (the rotation speed of the compressor 31) as a variable, the lower limit value of the fuel supply amount $m_{fuel}$ can be easily calculated in this case as well.

Further, when the control unit 7 can control the supply amount of the cathode gas as a function of time, $m_{air}(t)$, (or may be constant) and the outlet temperature of the fuel cell stack 1 can be approximated by a function of time as $T_{stk}(t)$ after a system stop command is given, since the function $f_1$ is a function that depends only on $f_1(T_{stk}(t), m_{air}(t))$ and time, the temperature sensor 5 can be omitted.

Further, according to FIG. 3, the fuel (anode gas) supply amount $m_{fuel}$ and the air (cathode gas) supply amount $m_{air}$ change continuously before and after a system stop command is given, but a level difference may be formed between immediately before and immediately after the system stop command is given.

[Stop Control of Fuel Cell System in High-Load State (without Power Generation)]

Figure 4:
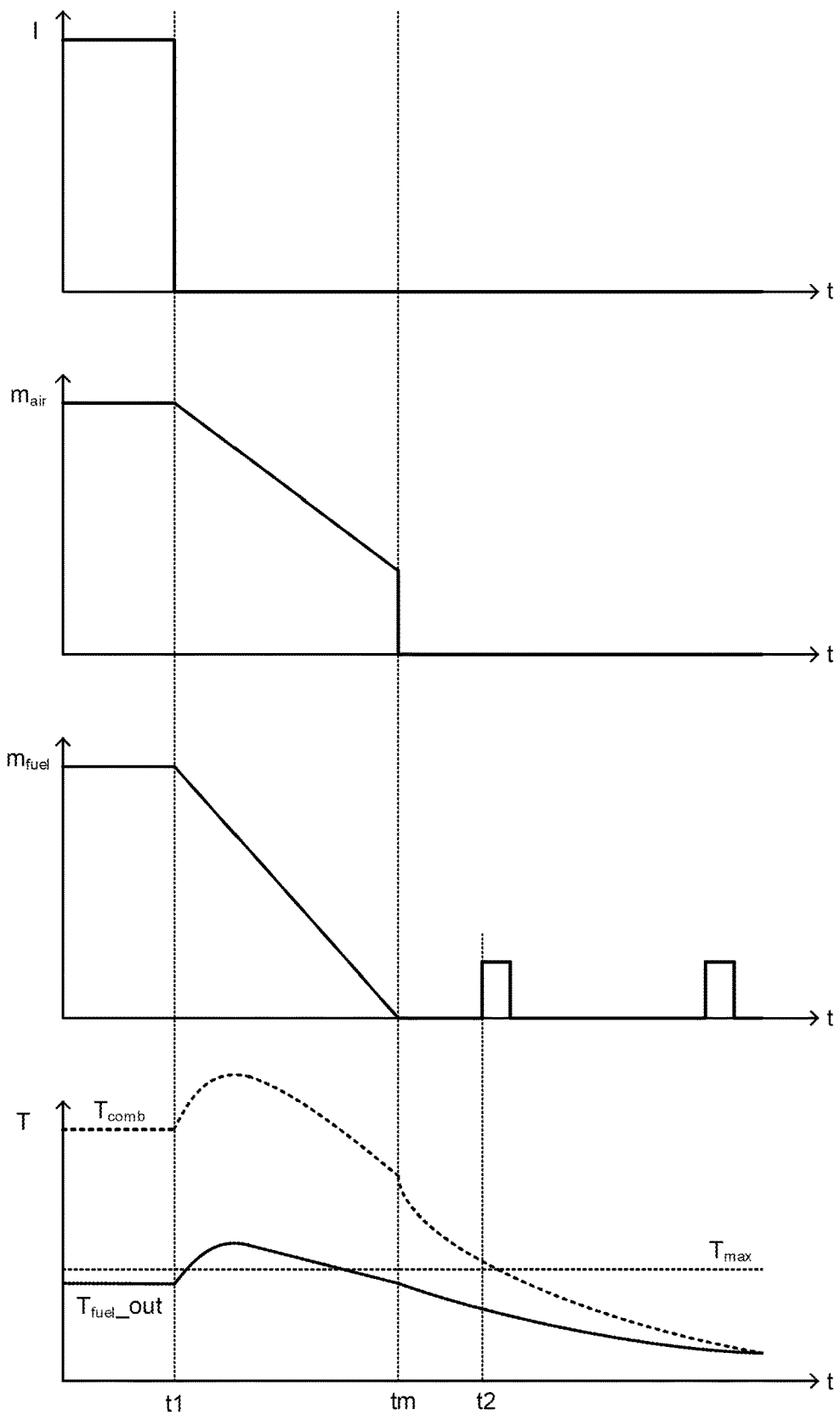
FIG. 4 is a time chart illustrating changes in a temperature of a combustor (combustion gas temperature) and an outlet temperature of a reformer (anode gas temperature) in a case where there is a system stop command when a fuel cell stack is in a high-load state and where an extraction current is set to zero at the time of the system stop command and an anode gas flow rate and a cathode gas flow rate are gradually reduced to zero.

FIG. 4 is a time chart illustrating changes in the temperature of the combustor 4 (combustion gas temperature) and the outlet temperature of the reformer 25 (anode gas temperature) in a case where there is a system stop command when the fuel cell stack 1 is in a high-load state and where the extraction current is set to zero and the anode gas flow rate and the cathode gas flow rate are gradually reduced to zero at the time of the system stop command.

The case where the fuel cell stack 1 is in a high-load state before a system stop command is given, that is, the case where the extraction current I (power generation amount), the fuel (anode gas) supply amount $m_{fuel}$, and the air (cathode gas) supply amount $m_{air}$ are larger than the normal (low-load state), will be examined.

Thus, as shown in FIG. 4, the case where the extraction current I is instantly set to zero according to a system stop command and a control is performed to gradually reduce the fuel (anode gas) supply amount $m_{fuel}$ and the air (cathode gas) supply amount $m_{air}$ will be examined.

Thus, a large amount of the anode gas and the cathode gas is supplied to the fuel cell stack 1 at the time of a system stop command, but since power generation is stopped in the fuel cell stack 1, the anode gas and the cathode gas are not consumed and are supplied to the combustor 4 as they are. Thus, in the combustor 4, at the time of a system stop command, the supply amount of the anode gas (fuel) and the cathode gas (oxygen) increases by the amount consumed by power generation until just before. Consequently, since the amount of combustion of the anode gas (fuel) and the catalyst gas (oxygen) in the combustor 4 increases, the temperature of the combustor 4 (combustion gas) exceeds the upper heat-resistance temperature limit of the combustor 4, and may cause a heat damage to the combustor 4. In addition, the combustion gas discharged from the combustor 4 is also higher in temperature than before the system stop command is given, the temperature of the anode gas and the cathode gas that exchange heat with the combustion gas exceeds the upper heat-resistance temperature limit of the fuel cell stack 1, and the supply of such gases to the fuel cell stack 1 may cause a heat damage to the fuel cell stack 1.

Thus, in this embodiment, if there is a system stop command when the fuel cell stack 1 is in a high-load state, the extraction current I (power generation amount) of the fuel cell stack 1 is gradually reduced to suppress the increase in the combustion amount of the anode gas (fuel) and the cathode gas (oxygen) in the combustor 4.

[Supply Amount (Upper Limit Value) of Fuel Supplied by Reformer during Stop Control]

As described above, when the fuel cell stack 1 is in a high-load state, power generation is continued even after the system is stopped. Therefore, if the supply amount of the fuel, which is supplied to the combustor 4 without being consumed in the fuel cell stack 1, is represented as $m_{fuel2}$, and if the amount of heat per unit mass of fuel is represented as LHV, the amount of heat generated by the combustor 4 is represented by $$m_{fuel2} \times LHV \qquad \text{[Equation 9]}$$

Further, the air (cathode gas) discharged from the fuel cell stack 1 is combusted by the combustor 4 and may be heated up to the upper heat-resistance temperature limit $T_{combmax}$ of the combustor 4, and the temperature of the cathode gas before combustion is the outlet temperature $T_{stk}$ of the fuel cell stack 1, and therefore, the increase in the amount of heat of air between before and after combustion is represented by $$m_{air} \times Cp_{air} \times (T_{combmax} - T_{stk}) \qquad \text{[Equation 10]}$$

Thus, considering that all the amount of heat during the combustion of fuel is used for raising the temperature of air, $$m_{fuel2} \times LHV = m_{air} \times Cp_{air} \times (T_{combmax} - T_{stk}) \qquad \text{[Equation 11]}$$

can be obtained from Equation 9 and Equation 10.

The temperature $T_{combmax}$ of the combustion gas can be treated as a constant. Therefore, the supply amount $m_{fuel}$ of the fuel to be supplied after a system stop command is given and the upper limit value $m_{fuel2}$ thereof can be expressed as $$m_{fuel} \leq m_{fuel2} = f_2(T_{stk}, m_{air}) \qquad \text{[Equation 12]}$$

so as to satisfy Equation 4 and Equation 11 simultaneously.

Here, like $f_1$, $f_2$ is a function of the outlet temperature $T_{stk}$ of the fuel cell stack 1 and the supply amount $m_{air}$ of the cathode gas, and can be formed in advance as a map having $T_{stk}$ and $m_{air}$ as parameters. Therefore, the control unit 7 can calculate the upper limit value $m_{fuel2}$ of the fuel supply amount after the system is stopped by estimating the outlet temperature $T_{stk}$ of the fuel cell stack 1 according to the temperature information input from the temperature sensor 5 and estimating the supply amount $m_{air}$ of the cathode gas according to the rotation speed of the compressor 31. The control unit 7 controls the fuel supply amount $m_{fuel}$ based on the upper limit value.

The upper limit value $m_{fuel2}$ is a function that decreases monotonically as the time elapses like the aforementioned lower limit value $m_{fuel1}$, but when $m_{fuel2}$ is always larger than $m_{fuel1}$, that is, when the fuel cell stack 1 is in a low-load state, the fuel supply amount $m_{fuel}$ at the time of a system stop command can be arbitrarily controlled within the range of $$m_{fuel1} \leq m_{fuel} \leq m_{fuel2} \qquad \text{[Equation 13]}$$

(see FIG. 3).

On the other hand, if there is a system stop command when the fuel cell stack 1 is in a high-load state, $m_{fuel1}$ may be larger than $m_{fuel2}$. In this case, even if the supply amount $m_{fuel}$ of the fuel at the time of the system stop command is set to its lower limit value $m_{fuel1}$, this supply amount is larger than $m_{fuel2}$. Thus, the temperature of the combustor 4 (combustion gas) exceeds the upper heat-resistance temperature limit thereof, and may cause a heat damage to the combustor 4. Further, since the combustion gas exchanges heat with the reformer 25 and the heat exchanger 32, the temperature of the fuel cell stack 1 exceeds the upper heat-resistance temperature limit thereof as a result, and may cause a heat damage to the fuel cell stack 1.

Thus, in this embodiment, by consuming the fuel difference between the lower limit value $m_{fuel1}$ and the upper limit value $m_{fuel2}$ in the fuel cell stack 1 by power generation, heat damage to the combustor 4 and the fuel cell stack 1 is avoided.

[Calculation of Fuel Supply Amount and Extraction Current During Stop Control]

Figure 5:
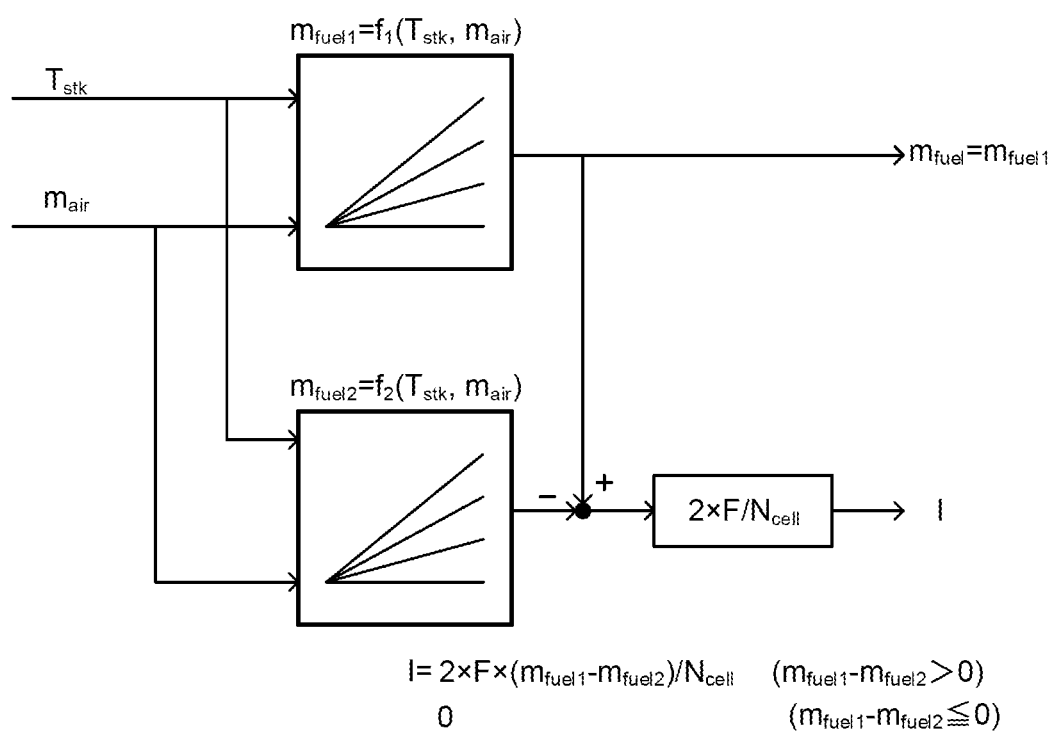
FIG. 5 is a diagram illustrating a control logic for calculating a fuel supply amount and an extraction current.

FIG. 5 is a diagram illustrating the control logic for calculating the fuel supply amount and the extraction current. The control unit 7 estimates the outlet temperature $T_{stk}$ of the fuel cell stack 1 from the temperature information input from the temperature sensor 5 after a system stop command is given, and calculates the air supply amount $m_{air}$ from the rotation speed of the compressor 31.

The control unit 7 calculates $m_{fuel1}$ (lower limit value) and $m_{fuel2}$ (upper limit value) from the outlet temperature $T_{stk}$ and the air supply amount $m_{air}$. The control unit 7, for example, sets $m_{fuel1}$ as the fuel supply amount $m_{fuel}$ after a system stop command is given.

The control unit 7 (the third control unit) calculates the difference between $m_{fuel1}$ (molar number) and $m_{fuel2}$ (molar number), and when $m_{fuel1} - m_{fuel2} > 0$, the extraction current I can be calculated by $$I = 2 \times F \times (m_{fuel1} - m_{fuel2}) / N_{cell} \qquad \text{[Equation 14]}$$

Regarding Equation 14, it is considered that "$N_{cell}$" represents the number of cells in the fuel cell stack 1, "F" represents the Faraday constant, and "2" represents that two electrons are emitted for the reaction of each hydrogen molecule during the electrochemical reaction. Further, Equation 14 can be formed in advance as a map having $m_{fuel1}$ and $m_{fuel2}$ as parameters. Further, the extraction current I represented by Equation 14 is the lower limit value, and a current larger than this may be extracted. Further, the extracted current can be supplied by the DC/DC converter 61 to the battery 62 (or the drive motor 63).

On the other hand, when $m_{fuel1} - m_{fuel2} \leq 0$, the control unit 7 (the third control unit) sets the extraction current I to 0, that is, controls to stop the power generation.

Further, in the stop control, the control unit 7 (the second control unit) can set the fuel supply amount $m_{fuel}$ to zero when the lower limit value $m_{fuel1}$ becomes zero. Further, the relation of $m_{fuel1} - m_{fuel2} > 0$ may continue until immediately before $m_{fuel1}$ becomes zero. In this case, the control unit 7 causes the power generation of the fuel cell stack 1 to continue until the fuel supply amount $m_{fuel}$ becomes zero (until immediately before $m_{fuel}$ becomes zero).

[Control Flow of this Embodiment]

Figure 6:
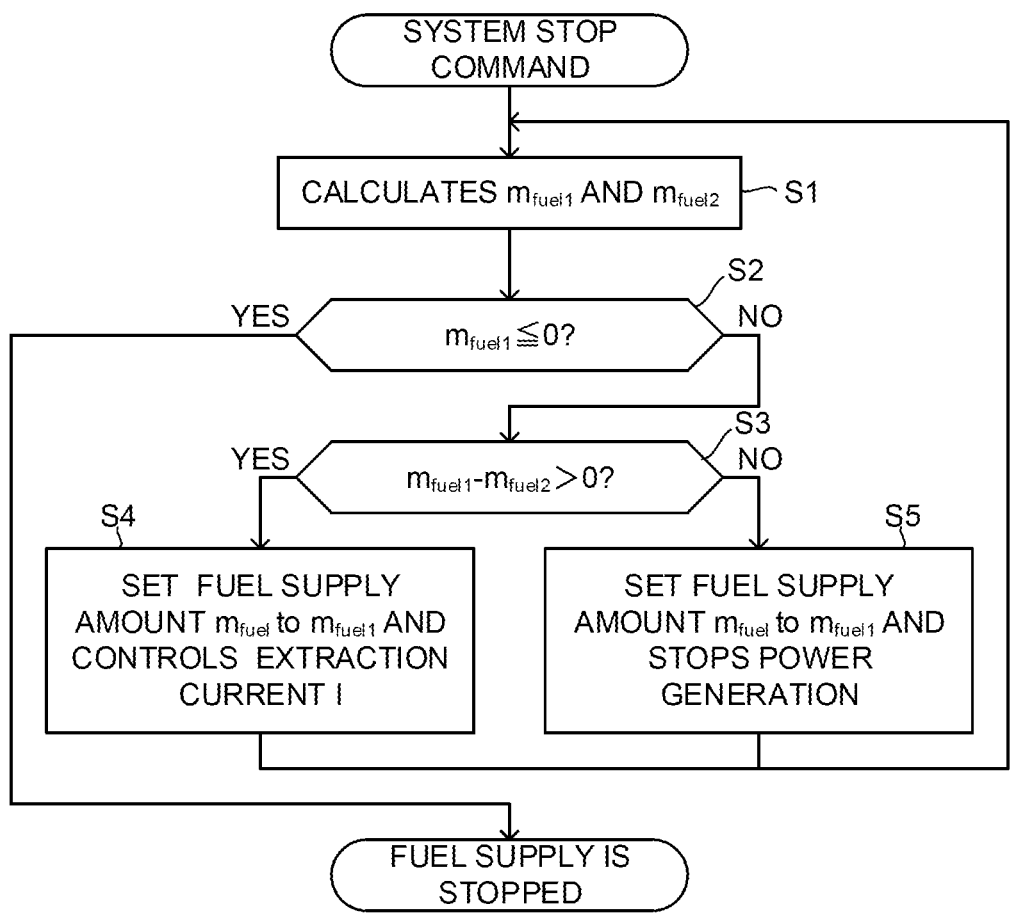
FIG. 6 is a flowchart illustrating a procedure from a system stop command to a stop of the fuel supply.

FIG. 6 is a flowchart illustrating the procedure from a system stop command to stopping the fuel supply.

If there is a system stop command, in Step S1, the control unit 7 calculates $m_{fuel1}$ and $m_{fuel2}$.

In Step S2, the control unit 7 (the second control unit) determines whether $m_{fuel1}$ is zero or less, if YES, the fuel supply based on Step S4 or Step S5 described later is stopped, and if NO, the process proceeds to Step S3.

In Step S3, the control unit 7 (the third control unit) determines whether $m_{fuel1} - m_{fuel2} > 0$, if YES, the process proceeds to Step S4, and if NO, the process proceeds to Step S5.

In Step S4, the control unit 7 (the second control unit) sets, for example, the fuel supply amount $m_{fuel}$ to the lower limit value $m_{fuel1}$ to supply fuel (anode gas) to the fuel cell stack 1 via the reformer 25, and the control unit 7 (the third control unit) further controls the extraction current I so that the extraction current I becomes a value based on Equation 14 or a higher value.

In Step S5, the control unit 7 (the second control unit) sets, for example, the fuel supply amount $m_{fuel}$ to the lower limit value $m_{fuel1}$ to supply fuel (anode gas) to the fuel cell stack 1 via the reformer 25, and the control unit 7 (the third control unit) further sets the extraction current I to zero to stop the power generation.

In Step S4, the control unit 7 (the second control unit) controls the air supply amount $m_{air}$ to satisfy the power generation amount in the fuel cell stack 1 and to obtain the optimal mixing ratio with the anode gas (fuel) when generating the combustion gas in the combustor 4.

In Step S5, the control unit 7 (the second control unit) controls the air supply amount $m_{air}$ to obtain the optimal mixing ratio with the anode gas (fuel) when producing the combustion gas in the combustor 4.

[Stop Control of Fuel Cell System in High-Load State (with Power Generation)]

Figure 7:
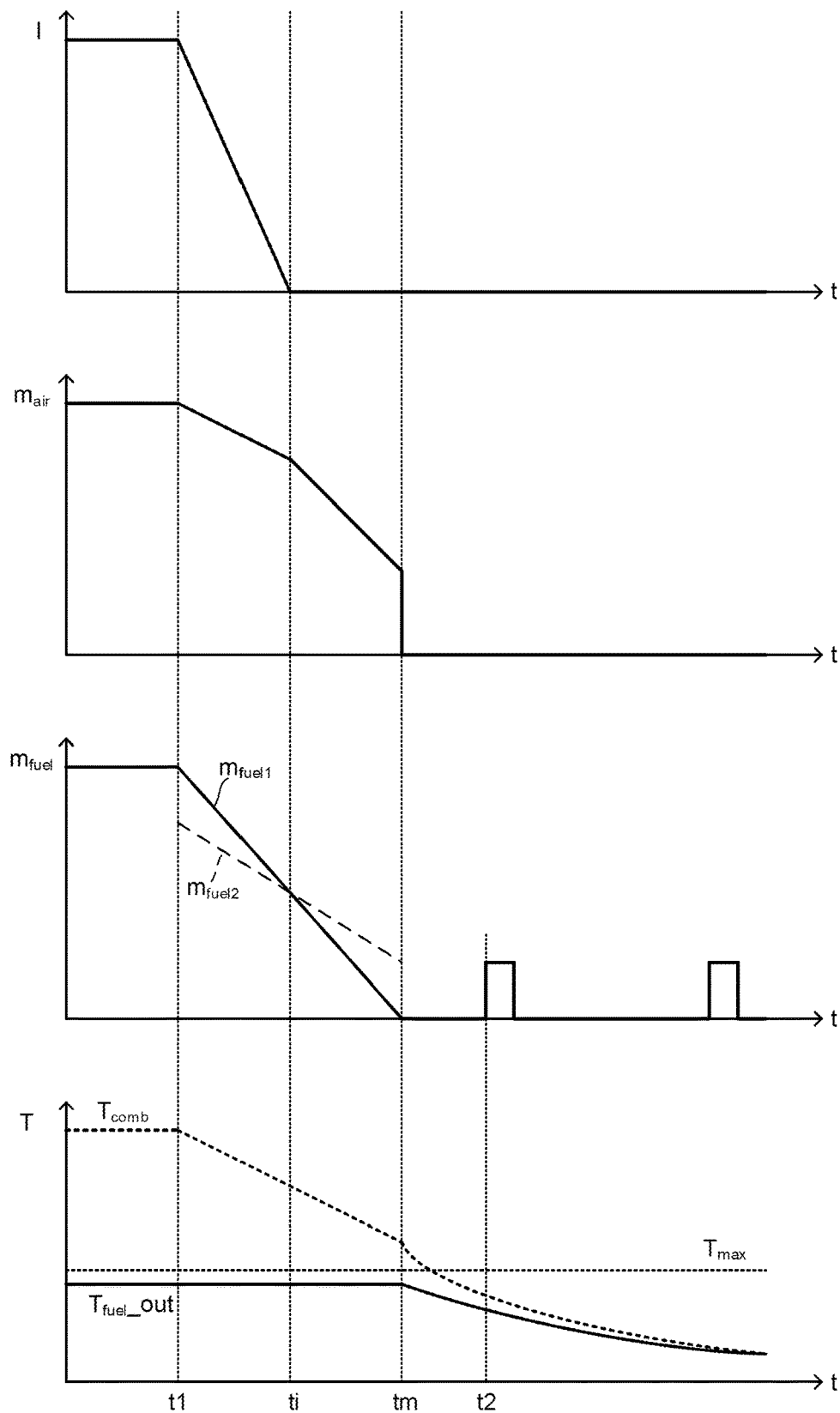
FIG. 7 is a time chart illustrating changes in a temperature of a combustor (combustion gas temperature) and an outlet temperature of a reformer (anode gas temperature) in a case where there is a system stop command when a fuel cell stack is in a high-load state and where an extraction current, an anode gas flow rate and a cathode gas flow rate are gradually reduced to zero from the time of the system stop command.

FIG. 7 is a time chart illustrating changes in the temperature of the combustor 4 (combustion gas temperature) and the outlet temperature of the reformer 25 (anode gas temperature) in a case where there is a system stop command when the fuel cell stack 1 is in a high-load state and where the extraction current, the anode gas flow rate and the cathode gas flow rate are gradually reduced to zero at the time of the system stop command.

FIG. 7 shows a case where fuel is supplied using the fuel supply amount $m_{fuel}$ at the time of a system stop as the lower limit value $m_{fuel1}$. Further, FIG. 7 shows a case, where $m_{fuel1}$ and $m_{fuel2}$ decrease monotonically as the time elapses, $m_{fuel1}$ is larger than $m_{fuel2}$ at the time of a system stop command (time t1), but such a magnitude relation is switched in the middle (time ti: t1<ti<tm<t2).

When a system stop command is received at time t1, the supply amount $m_{fuel}$ of the fuel (anode gas) is gradually reduced to $m_{fuel1}$, and the supply amount $m_{air}$ of the air (cathode gas) is reduced correspondingly. The extraction current I is gradually decreased while taking a value based on Equation 14 or a higher value. Consequently, the anode gas is consumed by the fuel cell stack 1, and the anode gas whose supply amount $m_{fuel}$ is $m_{fuel2}$ or less is supplied to the combustor 4.

Therefore, since the temperature rise of the combustor 4 (combustion gas) is avoided and the supply amount $m_{fuel}$ decreases as the time elapses after time t1, the temperature of the combustor 4 (combustion gas) gradually decreases. Thus, the temperature of the combustor 4 does not reach the upper heat-resistance temperature limit ($T_{combmax}$) thereof, and does not cause a heat damage to the combustor 4. Moreover, since the temperature rise of the combustion gas is avoided, the temperature (and the temperature of the heat exchanger 32) of the reformer 25 (anode gas) becomes almost constant.

At time ti, $m_{fuel1}$ becomes the same as $m_{fuel2}$, and after that, $m_{fuel1}$ becomes lower than $m_{fuel2}$, and therefore, the extraction current I becomes zero and power generation is stopped. Since power generation is stopped at time ti, the supply amount $m_{air}$ of air (cathode gas) then decreases at a faster rate as no power is generated.

At time tm, $m_{fuel1}$ becomes zero, and therefore, the supply of fuel (anode gas) is stopped. At time tm, the fuel supply is stopped, and therefore, the production of the combustion gas is also stopped, thereby further decreases the temperature of the reformer 25.

At time t2, additional fuel is supplied under the control of the control unit 7 (the first control unit), but the temperature of the anode gas (or unreformed fuel gas) becomes lower than the temperature at the time of power generation, and therefore, no heat damage occurs when the anode gas is supplied to the fuel cell stack 1.

Effect of this Embodiment

According to the fuel cell system of this embodiment, the fuel cell system comprises a solid oxide fuel cell (the fuel cell stack 1) capable of generating power by receiving a supply of a reformed gas (anode gas) and an oxidant gas (cathode gas), an oxidant gas supply device (the compressor 31) that supplies the oxidant gas (cathode gas) to the fuel cell (the fuel cell stack 1), a reforming unit (the reformer 25) that supplies the reformed gas (anode gas) to the fuel cell (the fuel cell stack 1), fuel supply devices (the pump 22, the injector 23) that supply the fuel which is the raw material for the reformed gas (anode gas) to the reforming unit (the reformer 25), and a combustion unit (the combustor 4) that combusts the discharged gases (anode off-gas, cathode off-gas) of the fuel cell (the fuel cell stack 1), wherein the reforming unit (the reformer 25) can reform the fuel into the reformed gas (anode gas) by exchanging heat with the combustion gas produced by the combustion unit (the combustor 4) and the first control unit (the control unit 7) controls the fuel supply device (the injector 23) to additionally supply fuel to the fuel cell (the fuel cell stack 1) through the reforming unit (the reformer 25) in order to prevent the oxidant gas (cathode gas) from flowing in from the downstream of the fuel electrode of the fuel cell (the fuel cell stack 1) at the time of stopping the system (at the time of stop control), and comprises the second control unit (the control unit 7) that controls to supply fuel to the reforming unit (the reformer 25) before the additional supply so that the temperature of the reformed gas (anode gas) flowing into the fuel cell (the fuel cell stack 1) does not exceed a predetermined temperature at the time of stopping the system (at the time of stop control).

According to the aforementioned configuration, in the reforming unit (the reformer 25), fuel is supplied even after a system stop command is given, and therefore, the reformed gas (anode gas) is pushed out without staying in the reforming unit (the reformer 25), and excessive heat exchange with the reformed gas (anode gas) can be avoided. In addition, the amount of reforming reaction (endothermic reaction) is hardly reduced by the newly supplied fuel. Therefore, the temperature rise of the fuel (anode gas) is suppressed and the heat capacity thereof can be maintained. Therefore, the temperature rise of the reformed gas (anode gas) pushed out from the reforming unit (the reformer 25) to the fuel cell stack 1 is suppressed by the subsequent additional fuel supply, and meanwhile, the temperature of the entire system can be lowered while maintaining the heat capacity of the fuel, and thus, the fuel cell system can stop the fuel supply while avoiding heat damage to the fuel cell stack 1.

In this embodiment, the predetermined temperature is the upper heat-resistance temperature limit of the fuel cell (the fuel cell stack 1). Consequently, heat damage to the fuel cell (the fuel cell stack 1) can be reliably avoided.

In this embodiment, the fuel supply amount (supply amount from t1 to tm) by the second control unit (the control unit 7) is larger than the fuel supply amount by the first control unit (the control unit 7). Consequently, it is possible to suppress the temperature rise of the reformed gas (anode gas) after a system stop command is given.

According to the fuel cell system of this embodiment, the fuel cell system comprises a solid oxide fuel cell (the fuel cell stack 1) capable of generating power by receiving a supply of a reformed gas (anode gas) and an oxidant gas (cathode gas), an oxidant gas supply device (the compressor 31) that supplies the oxidant gas (cathode gas) to the fuel cell (the fuel cell stack 1), a reforming unit (the reformer 25) that supplies the reformed gas (anode gas) to the fuel cell (the fuel cell stack 1), fuel supply devices (the pump 22, the injector 23) that supply the fuel which is the raw material for the reformed gas (anode gas) to the reforming unit (the reformer 25), and a combustion unit (the combustor 4) that combusts the discharged gases (anode off-gas, cathode off-gas) of the fuel cell (the fuel cell stack 1), wherein the reforming unit (the reformer 25) can reform the fuel into the reformed gas (anode gas) by exchanging heat with the combustion gas produced by the combustion unit (the combustor 4) and the first control unit (the control unit 7) controls the fuel supply device (the injector 23) to additionally supply fuel to the fuel cell (the fuel cell stack 1) through the reforming unit (the reformer 25) in order to prevent the oxidant gas (cathode gas) from flowing in from the downstream of the fuel electrode of the fuel cell (the fuel cell stack 1) at the time of stopping the system (at the time of stop control), and comprises the second control unit (the control unit 7) that controls to supply fuel to the reforming unit (the reformer 25) before the additional supply so that the temperature of the reforming unit (the reformer 25) does not exceed the upper heat-resistance temperature limit ($T_{max}$) of the fuel cell (the fuel cell stack 1) at the time of stopping the system (at the time of stop control).

According to the aforementioned configuration, in the reforming unit (the reformer 25), fuel is supplied even after a system stop command is given, and therefore, the reformed gas (anode gas) is pushed out without staying in the reforming unit (the reformer 25), and excessive heat exchange with the reformed gas (anode gas) can be avoided. In addition, the amount of reforming reaction (endothermic reaction) is hardly reduced by the newly supplied fuel. Therefore, the temperature rise of the fuel (anode gas) is suppressed and the heat capacity thereof can be maintained. Therefore, the temperature rise of the reformed gas (anode gas) pushed out from the reforming unit (the reformer 25) to the fuel cell stack 1 is suppressed by the subsequent additional fuel supply, and meanwhile, the temperature of the entire system can be lowered while maintaining the heat capacity of the fuel, and thus, the fuel cell system can stop the fuel supply while avoiding heat damage to the fuel cell stack 1.

In this embodiment, the second control unit (the control unit 7) calculates the lower limit value ($m_{fuel1}$) of the fuel flow rate so that the temperature of the reforming unit (the reformer 25) does not exceed the upper heat-resistance temperature limit ($T_{max}$) of the fuel cell (the fuel cell stack 1) to supply fuel at the lower limit value ($m_{fuel1}$).

Consequently, it is possible to decrease the temperature of the entire system while reducing the fuel consumption amount at the time of stopping the system (at the time of stop control).

This embodiment comprises the third control unit (the control unit 7) that controls the extraction current amount (I) of the fuel cell (the fuel cell stack 1) at the time of stopping the system (at the time of stop control), wherein the third control unit (the control unit 7) calculates the upper limit value ($m_{fuel2}$) of the fuel flow rate so as not to exceed the upper heat-resistance temperature limit ($T_{combmax}$) of the combustion unit (the combustor 4), and controls the extraction current amount (I) based on the difference between the lower limit value ($m_{fuel1}$) and the upper limit value ($m_{fuel2}$).

Consequently, the fuel consumption amount at the time of stopping the system (at the time of stop control) can be reduced, and the flow rate of the fuel supplied to the combustion unit (the combustor 4) by power generation can be set to the upper limit value ($m_{fuel2}$) or less, and therefore, it is possible to avoid heat damage to the fuel cell (the fuel cell stack 1) and the combustion unit (the combustor 4).

In this embodiment, the third control unit (the control unit 7) calculates the upper limit value ($m_{fuel2}$) based on at least one of the flow rate ($m_{air}$) of the oxidant gas (cathode gas) and the outlet temperature ($T_{stk}$) of the fuel cell (the fuel cell stack 1). Thereby, the upper limit value ($m_{fuel2}$) can be calculated by a simple method without mounting a sensor for detecting the temperature and the supply amount of the combustion gas.

In this embodiment, the third control unit (the control unit 7) sets the extraction current amount (I) to zero when the lower limit value ($m_{fuel1}$) becomes equal to or less than the upper limit value ($m_{fuel2}$). Thereby, the timing (ti) of power generation stop at the time of stop control can be easily determined.

In this embodiment, the second control unit (the control unit 7) calculates the lower limit value ($m_{fuel1}$) based on the flow rate ($m_{air}$) of the oxidant gas (cathode gas) and the outlet temperature ($T_{stk}$) of the fuel cell (the fuel cell stack 1). Thereby, the lower limit value ($m_{fuel1}$) can be calculated by a simple method without mounting a sensor for detecting the temperature and the supply amount of the combustion gas.

In this embodiment, the second control unit (the control unit 7) stops the supply of fuel when the lower limit value ($m_{fuel1}$) becomes zero. Thereby, the timing (tm) of fuel supply stop at the time of stop control can be easily determined.

In this embodiment, the second control unit (the control unit 7) controls the flow rate ($m_{air}$) of the oxidant gas (cathode gas) via the oxidant gas supply device (the compressor 31) corresponding to the fuel flow rate ($m_{fuel}$) at the time of stopping the system. Thereby, the electric power consumed during stop control can be reduced.

According to the method for controlling the fuel cell system of this embodiment, the method comprises reforming the fuel which is the raw material for the reformed gas (anode gas) into the reformed gas (anode gas) in the reforming unit (the reformer 25) by exchanging heat with the combustion gas produced by combusting the discharged gases (anode off-gas, cathode off-gas) of the fuel cell (the fuel cell stack 1) when the reformed gas (anode gas) generated by the reforming unit (the reformer 25) and the oxidant gas (cathode gas) are supplied to a solid oxide fuel cell (the fuel cell stack 1) to generate power; additionally supplying fuel to the fuel cell (the fuel cell stack 1) through the reforming unit (the reformer 25) in order to prevent the oxidant gas (cathode gas) from flowing in from the downstream of the fuel electrode (anode) of the fuel cell (the fuel cell stack 1) at the time of stopping the system (at the time of stop control); and the method for controlling the fuel cell including supplying fuel to the reforming unit (the reformer 25) before the additional supply so that the temperature of the reformed gas (anode gas) flowing into the fuel cell (the fuel cell stack 1) does not exceed a predetermined temperature at the time of stopping the system (at the time of stop control).

According to the aforementioned method, in the reforming unit (the reformer 25), fuel is supplied even after a system stop command is given, and therefore, the reformed gas (anode gas) is pushed out without staying in the reforming unit (the reformer 25), and excessive heat exchange with the reformed gas (anode gas) can be avoided. In addition, the amount of reforming reaction (endothermic reaction) is hardly reduced by the newly supplied fuel. Therefore, the temperature rise of the fuel (anode gas) is suppressed and the heat capacity thereof can be maintained. Therefore, the temperature rise of the reformed gas (anode gas) pushed out from the reforming unit (the reformer 25) to the fuel cell stack 1 is suppressed by the subsequent additional fuel supply, and meanwhile, the temperature of the entire system can be lowered while maintaining the heat capacity of the fuel, and thus, the fuel supply can be stopped while avoiding heat damage to the fuel cell stack 1.

The invention claimed is:

1. A fuel cell system, comprising:
   a solid oxide fuel cell configured to generate power by receiving a reformed gas and an oxidant gas;
   an oxidant gas supply device configured to supply the oxidant gas to the fuel cell;
   a reforming unit configured to supply the reformed gas to the fuel cell;
   a fuel supply device configured to supply a fuel, which is a raw material for the reformed gas, to the reforming unit;
   a combustion unit configured to combust discharged gases of the fuel cell; wherein:
   the reforming unit is configured to reform the fuel into the reformed gas by exchanging heat with a combustion gas produced by the combustion unit;
   the fuel cell system further comprises at least one controller programmed to, at a time of stopping the system, control the fuel supply device to intermittently perform an additional fuel supply to the fuel cell through the reforming unit according to a temperature decrease of the fuel cell in order to prevent the oxidant gas from flowing in from downstream of a fuel electrode of the fuel cell; and
   the at least one controller is configured to, before the additional fuel supply, control the supply of the fuel to the reforming unit so that a temperature of the reformed gas flowing into the fuel cell does not exceed a predetermined temperature at the time of stopping the system, and then stop the supply of the fuel to the reforming unit.

2. The fuel cell system according to claim 1, wherein (i) an amount of the fuel supplied during the control of the supply of the fuel to the reforming unit before the additional fuel supply, is larger than (ii) an amount of the fuel supplied to the reforming unit during the additional fuel supply.

3. A fuel cell system, comprising:
   a solid oxide fuel cell configured to generate power by receiving a reformed gas and an oxidant gas;
   an oxidant gas supply device configured to supply the oxidant gas to the fuel cell;
   a reforming unit configured to supply the reformed gas to the fuel cell;
   a fuel supply device configured to supply a fuel, which is a raw material for the reformed gas, to the reforming unit;
   a combustion unit configured to combust discharged gases of the fuel cell; wherein:
   the reforming unit is configured to reform the fuel into the reformed gas by exchanging heat with a combustion gas produced by the combustion unit;
   the fuel cell system further comprises at least one controller programmed to, at a time of stopping the system, control the fuel supply device to intermittently perform an additional fuel supply to the fuel cell through the reforming unit according to a temperature decrease of the fuel cell in order to prevent the oxidant gas from flowing in from downstream of a fuel electrode of the fuel cell; and
   the at least one controller is configured to, before the additional fuel supply, control the supply of the fuel to the reforming unit so that a temperature of the reforming unit does not exceed an upper heat-resistance temperature limit of the fuel cell at the time of stopping the system, and then stop the supply of the fuel to the reforming unit.

4. The fuel cell system according to claim 1, wherein:
   the at least one controller is further programmed to calculate a lower limit value of a flow rate of the fuel so that the temperature of the reforming unit does not exceed the upper heat-resistance temperature limit of the fuel cell to supply the fuel at the lower limit value.

5. The fuel cell system according to claim 4, wherein:
   the at least one controller is further programmed to control an extraction current amount of the fuel cell at the time of stopping the system, which comprises:
   calculating an upper limit value of the flow rate of the fuel so as not to exceed the upper heat-resistance temperature limit of the combustion unit, and
   controlling the extraction current amount based on the difference between the lower limit value and the upper limit value.

6. The fuel cell system according to claim 5, wherein:
   the at least one controller is further programmed to calculate the upper limit value based on at least one of a flow rate of the oxidant gas and an outlet temperature of the fuel cell.

7. The fuel cell system according to claim 6, wherein:
   the at least one controller is further programmed to set the extraction current amount to zero when the lower limit value becomes equal to or less than the upper limit value.

8. The fuel cell system according to claim 4, wherein:
   the at least one controller is further programmed to calculate the lower limit value based on a flow rate of the oxidant gas and an outlet temperature of the fuel cell.

9. The fuel cell system according to claim 4, wherein:
   the at least one controller is further programmed to stop supplying the fuel when the lower limit value becomes zero.

10. The fuel cell system according to claim 1, wherein:
the at least one controller is further programed to control a flow rate of the oxidant gas via the oxidant gas supply device corresponding to a flow rate of the fuel at the time of stopping the system.

11. A method for controlling a fuel cell system comprising:
reforming a fuel,. which is a raw material for a reformed gas,. into the reformed gas in a reforming unit by exchanging heat with a combustion gas produced by combusting discharged gases of a fuel cell when the reformed gas generated by the reforming unit and an oxidant gas are supplied to a solid oxide fuel cell to generate power;
intermittently performing an additional fuel supply to the fuel cell through the reforming unit according to a temperature decrease of the fuel cell in order to prevent the oxidant gas from flowing in from downstream of a fuel electrode of the fuel cell at a time of stopping the system;
supplying the fuel to the reforming unit before the additional fuel supply so that a temperature of the reformed gas flowing into the fuel cell does not exceed a predetermined temperature at the time of stopping the system; and
stopping the supply of the fuel to the reforming unit before the additional fuel supply.

12. The fuel cell system according to claim 1, wherein the the at least one controller is further programmed to gradually reduce a supply amount of the fuel to the reforming unit and stops the supply of the fuel to the reforming unit before the additional fuel supply.

* * * * *